US011345389B2

(12) United States Patent
Buzzard et al.

(10) Patent No.: US 11,345,389 B2
(45) Date of Patent: May 31, 2022

(54) RAKE ADJUSTMENT ASSEMBLY OF STEERING COLUMN

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US); Joen C. Bodtker, Gaines, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 142 days.

(21) Appl. No.: 16/803,477

(22) Filed: Feb. 27, 2020

(65) Prior Publication Data
US 2020/0324802 A1 Oct. 15, 2020

Related U.S. Application Data

(60) Provisional application No. 62/831,547, filed on Apr. 9, 2019.

(51) Int. Cl.
B62D 1/184 (2006.01)
B62D 1/189 (2006.01)

(52) U.S. Cl.
CPC ............. B62D 1/184 (2013.01); B62D 1/189 (2013.01)

(58) Field of Classification Search
CPC ................................ B62D 1/184; B62D 1/189
See application file for complete search history.

(56) References Cited

U.S. PATENT DOCUMENTS 5,338,064 A * 8/1994 Sadakata ................ B62D 1/184
280/775
5,531,317 A * 7/1996 Tomaru .................. B62D 1/184
280/775
(Continued)

FOREIGN PATENT DOCUMENTS

CN 201240416 Y 5/2009
CN 102630205 A 8/2012
(Continued)

OTHER PUBLICATIONS

Office Action regarding corresponding DE App. No. 10 2020 109 175.3; dated Nov. 29, 2021.
(Continued)

Primary Examiner — Nicole T Verley
(74) Attorney, Agent, or Firm — Dickinson Wright PLLC

(57) ABSTRACT

A rake assembly for a steering column includes a pin adapted to move along a first axis between a locked position and an unlocked position. The rake assembly also includes a first tray fixed to a support structure, the first tray having a plurality of teeth. The rake assembly further includes a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis.

20 Claims, 8 Drawing Sheets

(56) References Cited

U.S. PATENT DOCUMENTS

| | | | | |
|---|---|---|---|---|
| 5,722,299 A * | 3/1998 | Yamamoto | ............ | B62D 1/184 280/775 |
| 5,787,759 A | 8/1998 | Olgren | | |
| 5,934,150 A * | 8/1999 | Srinivas | ............ | F16C 1/223 74/502.4 |
| 6,092,955 A * | 7/2000 | Chartrain | ............ | B62D 1/184 403/104 |
| 6,092,957 A * | 7/2000 | Fevre | ............ | B62D 1/184 280/775 |
| 6,390,717 B1 * | 5/2002 | Bar | ............ | B62D 1/184 403/104 |
| 9,073,573 B2 * | 7/2015 | Sugiura | ............ | B62D 1/18 |
| 9,156,491 B2 * | 10/2015 | Okano | ............ | B62D 1/187 |
| 9,187,115 B2 * | 11/2015 | Kakishita | ............ | B62D 1/184 |
| 9,428,214 B2 * | 8/2016 | Ku | ............ | B62D 1/184 |
| 9,718,490 B2 * | 8/2017 | Tanaka | ............ | B62D 1/184 |
| 10,196,080 B2 * | 2/2019 | Kim | ............ | B62D 1/185 |
| 10,640,141 B2 * | 5/2020 | Kwon | ............ | B62D 1/189 |
| 2008/0231030 A1 * | 9/2008 | Menjak | ............ | B62D 1/184 280/775 |
| 2012/0125139 A1 * | 5/2012 | Tinnin | ............ | B62D 1/184 74/493 |
| 2017/0066467 A1 * | 3/2017 | Russell | ............ | B62D 1/184 |
| 2018/0141582 A1 * | 5/2018 | Bodtker | ............ | B62D 1/184 |
| 2019/0337552 A1 * | 11/2019 | Buzzard | ............ | B62D 1/184 |
| 2020/0324802 A1 * | 10/2020 | Buzzard | ............ | B62D 1/189 |
| 2021/0276608 A1 * | 9/2021 | Dubay | ............ | B62D 1/187 |

FOREIGN PATENT DOCUMENTS

| | | | | |
|---|---|---|---|---|
| CN | 105711635 A | | 6/2016 | |
| CN | 107487353 A | * | 12/2017 | |
| CN | 112339853 A | * | 2/2021 | |
| DE | 3619125 C1 | * | 10/1987 | ............ F16B 5/0225 |
| DE | 19805289 A1 | | 8/1998 | |
| DE | 19839496 A1 | * | 3/2000 | ............ B62D 1/184 |
| DE | 19915341 A1 | * | 10/2000 | ............ B62D 1/184 |
| DE | 10217534 A1 | * | 11/2003 | ............ B62D 1/184 |
| DE | 102005036582 A1 | | 2/2007 | |
| DE | 102008007094 A1 | * | 9/2009 | ............ B62D 1/195 |
| EP | 0167925 A1 | * | 1/1986 | ............ B62D 1/184 |
| EP | 1500570 A2 | * | 1/2005 | ............ B62D 1/184 |
| EP | 3666624 A1 | * | 6/2020 | ............ B62D 1/184 |
| GB | 2352286 A | * | 1/2001 | ............ B62D 1/184 |
| GB | 2456040 A | * | 7/2009 | ............ B62D 1/184 |
| GB | 2465179 A | * | 5/2010 | ............ B62D 1/184 |
| GB | 2521518 A | * | 6/2015 | ............ B62D 1/184 |
| JP | 2016005930 A | * | 1/2016 | ............ B62D 1/189 |
| JP | 6350849 B2 | * | 7/2018 | ............ B62D 1/187 |
| KR | 20160050315 A | | 5/2016 | |
| WO | WO-2004087483 A2 | * | 10/2004 | ............ F16C 33/04 |
| WO | WO-2005102818 A1 | * | 11/2005 | ............ B62D 1/184 |
| WO | WO-2007014408 A1 | * | 2/2007 | ............ B62D 1/184 |
| WO | WO-2009047516 A1 | * | 4/2009 | ............ B62D 1/184 |
| WO | WO-2019147032 A1 | * | 8/2019 | ............ B62D 1/19 |

OTHER PUBLICATIONS

Office Action regarding corresponding CN App. No. 202010273360.4; dated Mar. 11, 2022.

* cited by examiner

RAKE ADJUSTMENT ASSEMBLY OF STEERING COLUMN

CROSS-REFERENCE TO RELATED APPLICATION

This application claims priority to U.S. Provisional Patent Application No. 62/831,547, filed Apr. 9, 2019, the disclosure of which is incorporated by reference herein in its entirety.

BACKGROUND OF THE DISCLOSURE

The present invention relates to steering columns, and more particularly, to a rake adjustment assembly of the steering column.

Rake adjustment assemblies are known to include teeth that mesh together when the rake adjustment assembly is placed in a locked position after the desired rake adjustment is made. Unfortunately, if the teeth between elements are not properly aligned while locking, damage to the teeth and/or difficulty in locking the rake adjustment assembly may occur.

Accordingly, it is desirable to design a rake adjustment assembly that is more robust, reliable, and has self-aligning teeth.

SUMMARY OF THE INVENTION

According to one aspect of the disclosure, a rake assembly for a steering column includes a pin adapted to move along a first axis between a locked position and an unlocked position. The rake assembly also includes a first tray fixed to a support structure, the first tray having a plurality of teeth. The rake assembly further includes a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis.

According to another aspect of the disclosure, a rake assembly for a steering column includes a pin adapted to move along a first axis between a locked position and an unlocked position. The rake assembly also includes a first tray fixed to a support structure, the first tray having a plurality of teeth. The rake assembly further includes a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis, wherein the plurality of teeth of the rocker tray are located on an inner surface of the rocker tray, the rocker tray including an outer surface defined by a first segment and a second segment, wherein the first segment and the second segment are planar segments oriented at a non-parallel angle relative to each other. The rake assembly yet further includes a spring in contact with the rocker tray and adapted to bias the rake assembly toward the unlocked position. The rake assembly also includes a first opening defined by the support structure, a second opening defined by the first tray, and a third opening defined by the rocker tray, wherein the spring is at least partially disposed within the first opening and the second opening.

According to yet another aspect of the disclosure, a steering column assembly includes a jacket pivotable about a rake axis. The steering column assembly also includes a pin having a lever operatively coupled to a first end of the pin, the moveable along a first axis between a locked position and an unlocked position. The steering column assembly further includes a support structure operatively coupled to the jacket. The steering column assembly yet further includes a first tray fixed to the support structure, the first tray having a first plurality of teeth and a second plurality of teeth. The steering column assembly also includes a rocker tray having a third plurality of teeth and a fourth plurality of teeth, the first plurality of teeth adapted to mesh with the third plurality of teeth, and the second plurality of teeth adapted to mesh with the fourth plurality of teeth when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray. The steering column assembly also includes a spring in contact with the rocker tray and adapted to bias the rake assembly toward the unlocked position. The steering column assembly further includes a first opening defined by the support structure, a second opening defined by the first tray, and a third opening defined by the rocker tray, wherein the spring is at least partially disposed within the first opening and the second opening.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
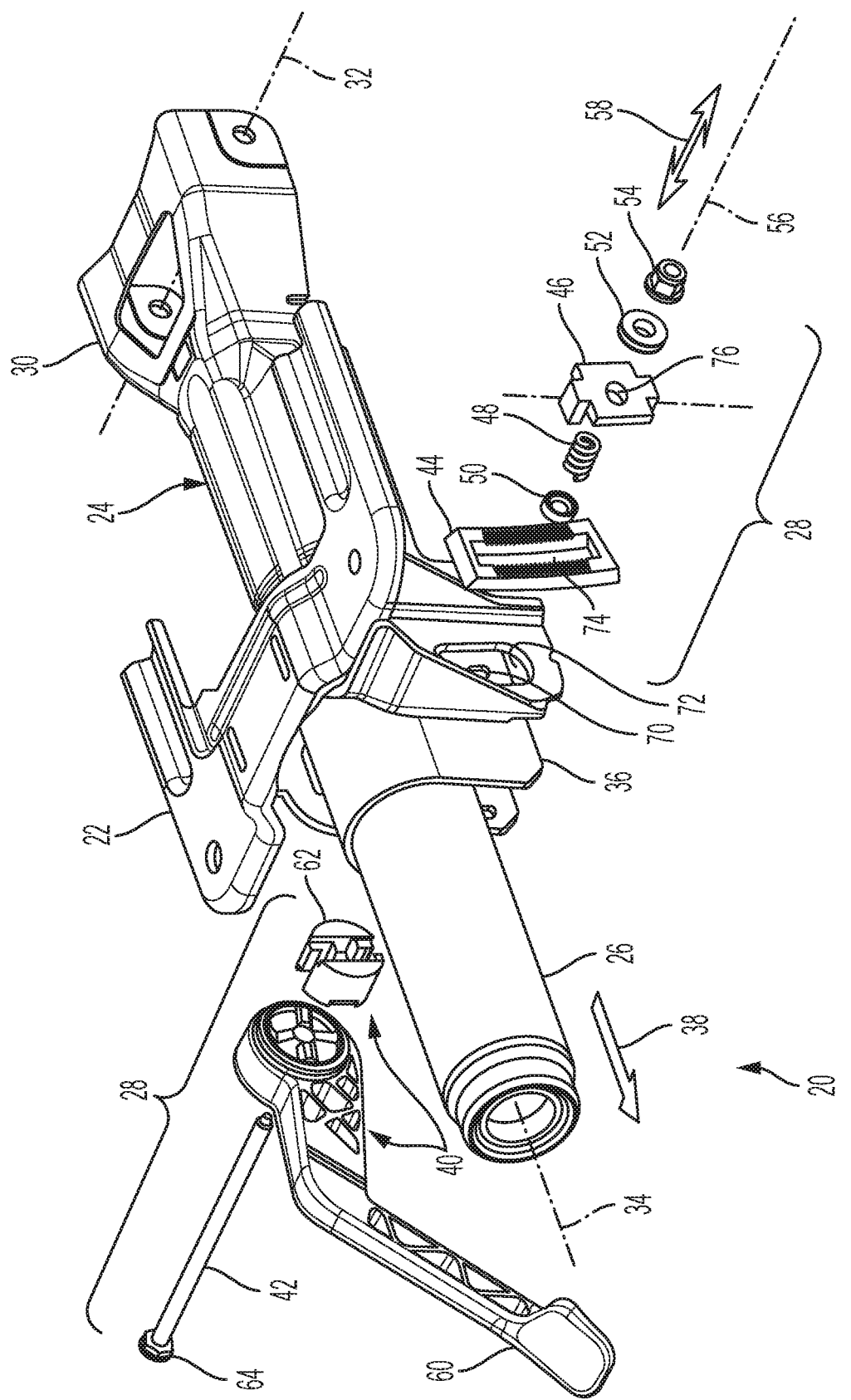
FIG. 1 is an unassembled perspective view of a steering column having a rake adjustment assembly as one exemplary embodiment of the present disclosure.

Referring now to the Figures, where the invention will be described with reference to specific embodiments, without limiting same, a steering column 20 is illustrated. Referring to FIG. 1, the steering column 20 includes a support structure 22, a lower jacket 24, an upper jacket 26, and a rake adjustment assembly 28. The support structure 22 may be stationary and adapted to rigidly attach to a structure (e.g., dash) of a vehicle. A forward end portion 30 of the lower jacket 24 is pivotally attached to a stationary structure (not shown) of the vehicle for pivoting about a pivot axis 32. The upper jacket 26 is telescopically supported by the lower jacket 24 such that both co-extend along a telescopic axis 34 (i.e., also rotation axis) orientated substantially normal to the pivot axis 32. The upper jacket 26 axially projects outward from a rearward end portion 36 of the lower jacket 24, and is adapted to axially adjust between retracted and extended positions with respect to the lower jacket 24 for the convenience and/or comfort of a vehicle operator. Although not illustrated, a steering shaft is supported in-part by the upper jacket 26 for rotation about the axis 34, and projects axially rearward (see arrow 38 in FIG. 1) from the upper jacket 26 for engagement to a steering wheel (not shown).

Where the telescopic adjustment of the jackets 24, 26 is substantially horizontal and, where the steering column is so configured, generally functions to adjust the steering wheel rearward toward the vehicle operator and forward away from the vehicle operator, the rake adjustment assembly 28 is adapted to adjust the vertical position (i.e., rake position) of the steering wheel by pivoting the jackets 24, 26 about the pivot axis 32. In other words, the embodiments disclosed herein may be utilized in a steering column that has telescoping and/or a rake adjustment capabilities.

Figure 2:
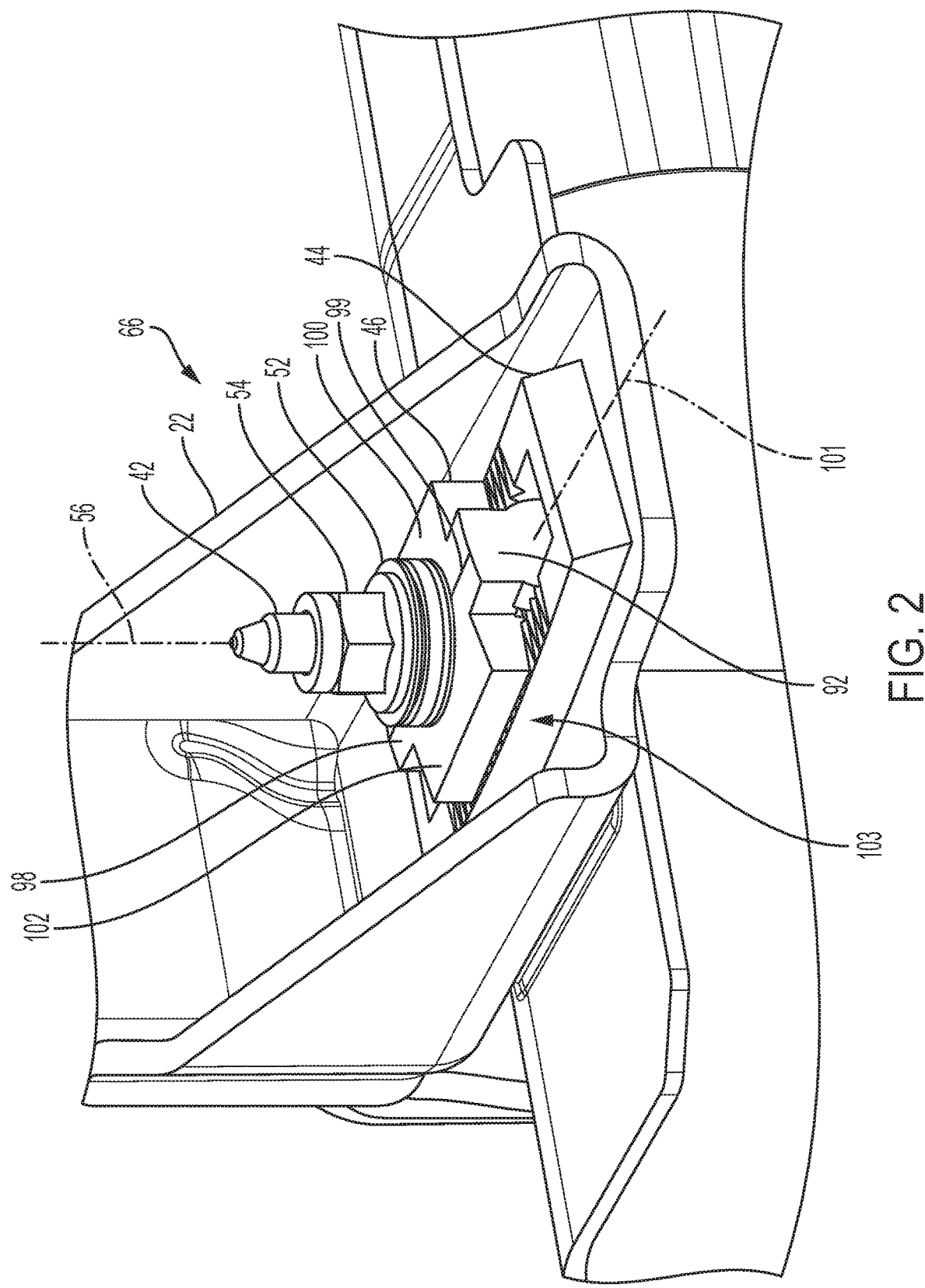
FIG. 2 is a partial, assembled, perspective view of the rake adjustment assembly in a locked position.

Referring to FIGS. 1 and 2, the rake adjustment assembly 28 is generally carried and supported between the support structure 22 and the rearward end portion 36 of the lower jacket 24. In one example, the assembly 28 includes a lever device 40, a pin 42 (e.g., bolt), an inner, or fixed, tray 44, an outer, or rocker, tray 46, a resilient biasing member 48 (e.g., an axially compressible spring or a torsion spring), a spring seat element 50, a thrust bearing 52, and a fastener 54 (e.g., threaded nut). In one example, the lever device 40 is adapted to convert rotational, or rotary, motion about an axis 56 into axial motion with respect to axis 56 (see arrow 58 in FIG. 1). The lever device 40 includes a lever 60 (e.g., manual lever) and cam member 62. In one example, the spring 48 is adapted to produce an axial force with respect to axis 56 that biases an enlarged head 64 of the pin 42 (e.g., a hexagonal bolt head) against the lever 60, and biases the rocker tray 46 against the thrust bearing 52, which in-turn is biased against the threaded nut 54 at an opposite end of the pin 42.

Figure 3:
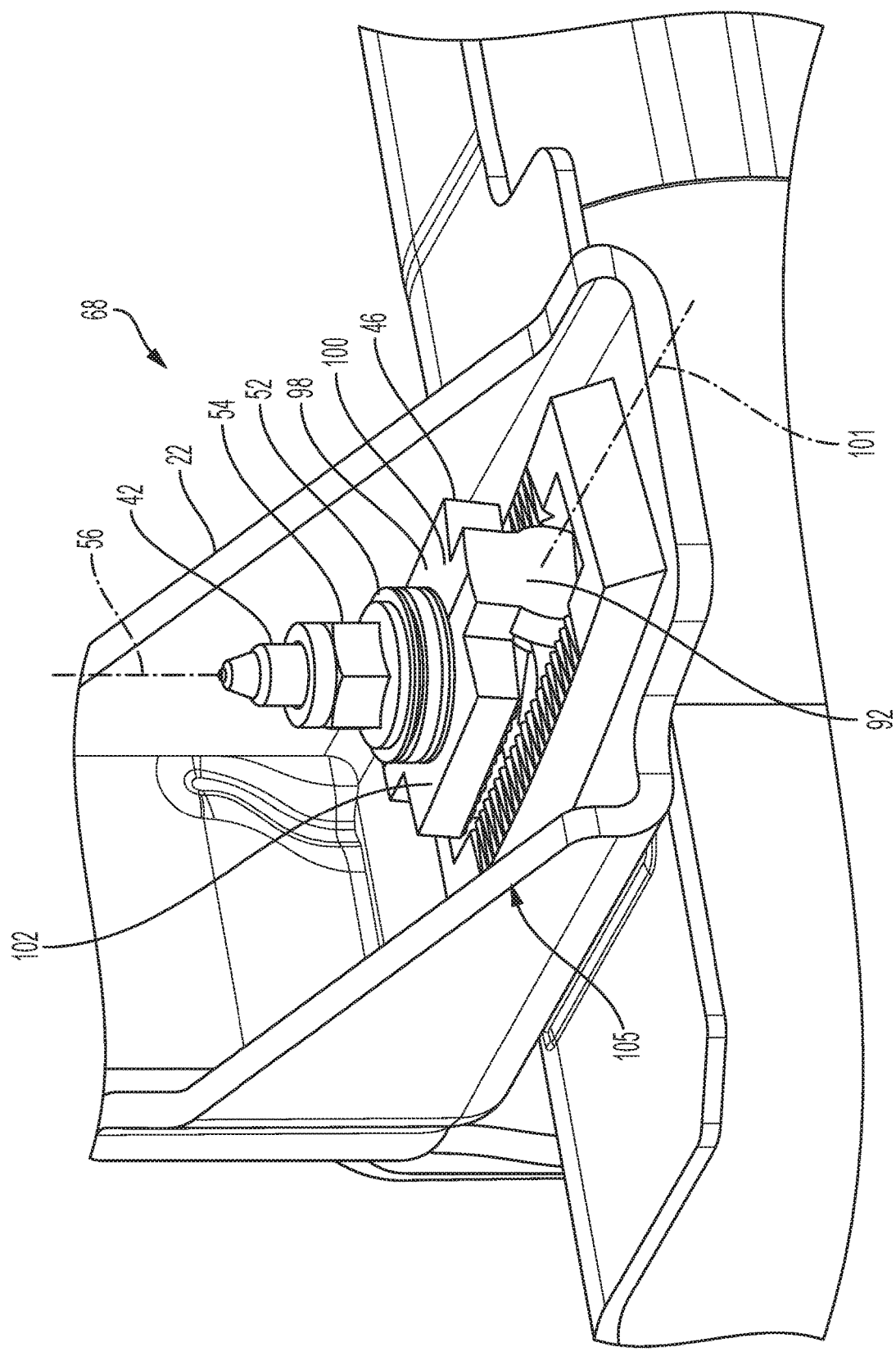
FIG. 3 is a partial, assembled, perspective view of the rake adjustment assembly in an unlocked position.
Figure 4:
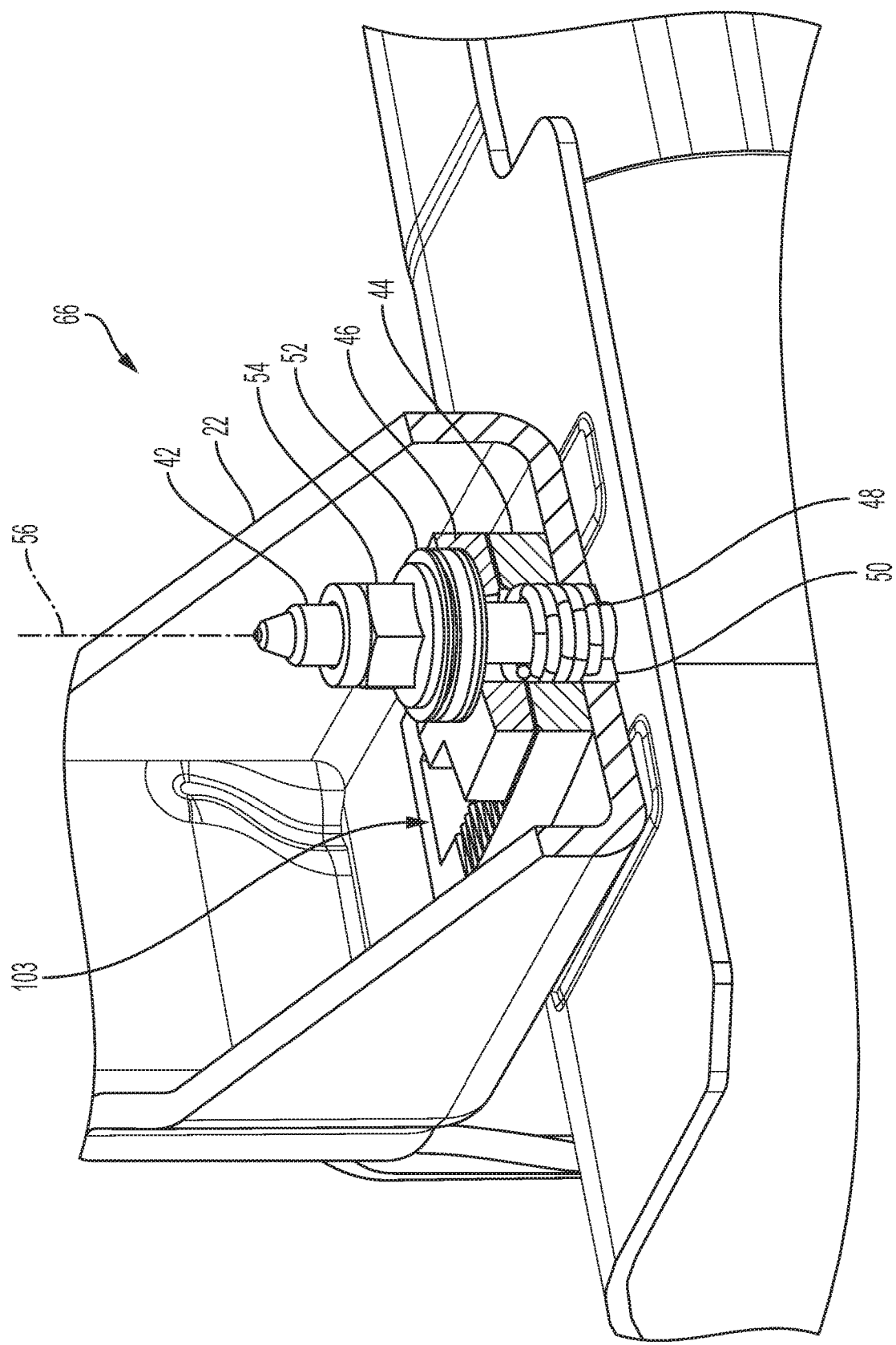
FIG. 4 is a partial, perspective, cross section of the rake adjustment assembly in the locked position.
Figure 5:
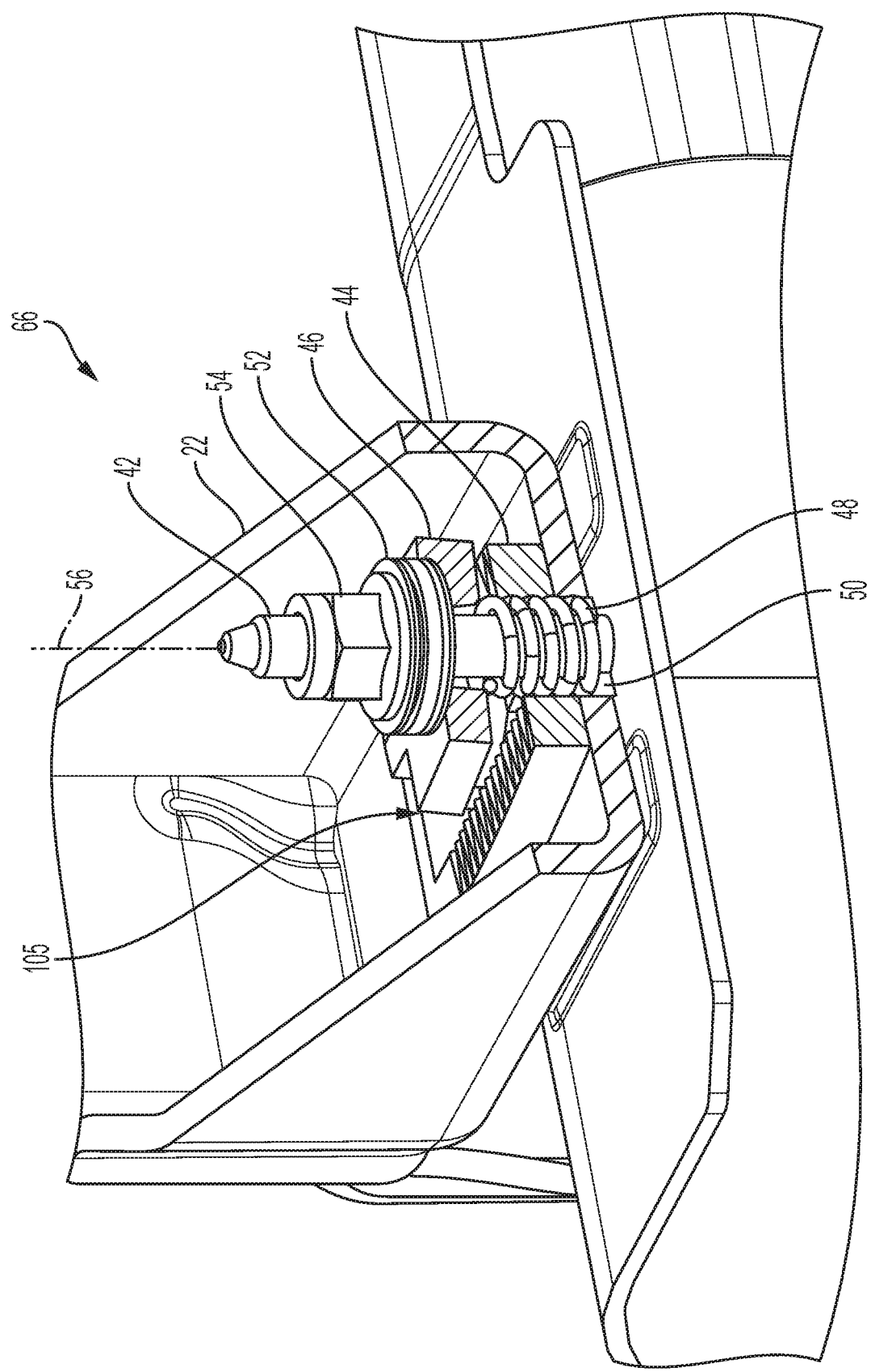
FIG. 5 is a partial, perspective, cross section of the rake adjustment assembly in the unlocked position.

During operation, actuation of the lever 60 causes the pin 42 to rotate about axis 56, and a cam interface between the cam member 62 and the lever 60 causes the pin to move axially along axis 56 as the pin 42 rotates. The rotation of the pin 42 causes the rake assembly 28 to switch between a lock position 66 (see FIGS. 2, 4, and 6), and an unlocked position 68 (see FIGS. 3, 5, and 7). In one example, axis 56 is substantially parallel to axis 32, and normal to axis 34. In another embodiment, the lever may be fixed to the pin 42, therefore the enlarged head 64 is not required. In another embodiment, the thrust bearing may not be required, thus the rocker tray 46 is biased directly against the threaded nut, or fastener, 54.

The pin 42 axially projects through openings 70, 72, 74, 76 in the respective end portion 36 of the lower jacket 24, the support structure 22, the inner tray 44, and rocker tray 46 (see FIG. 1). The pin 42 is adapted to move with respect to the lower jacket 24, the support structure 22, the inner tray 44 and the rocker tray 46. In one example, the opening 70 is a round hole having a radius substantially equal to a radius of the pin 42. The openings 72, 74 are elongated generally in a vertical direction (i.e., the direction of rake motion), and the opening 76 is elongated in an axial direction with respect to axis 34 to facilitate a rocking motion of the rocker tray 46.

Figure 8:
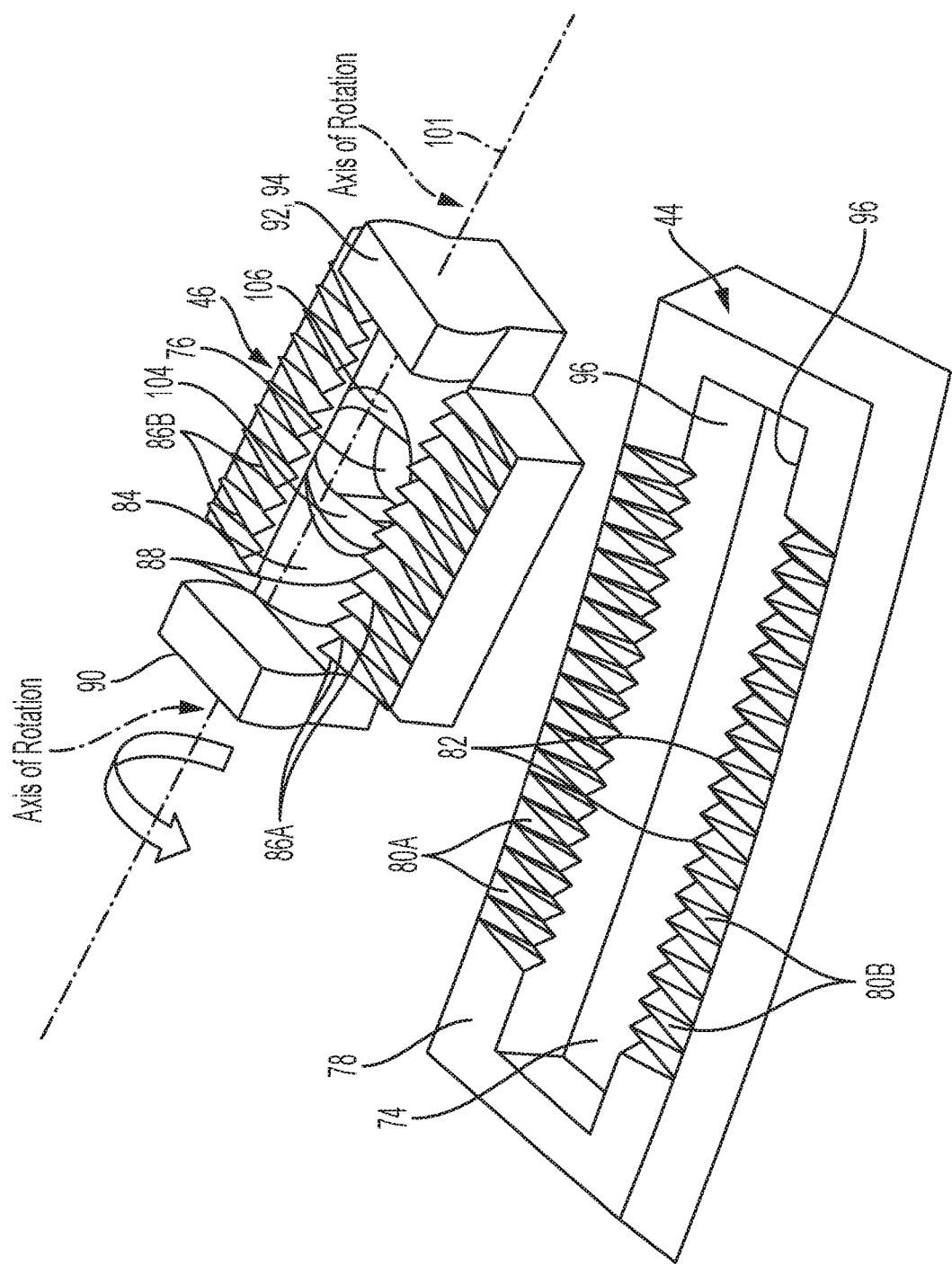
FIG. 8 is a perspective view of an inner tray and a rocker tray of the rake adjustment assembly.

Referring to FIGS. 1 and 8, the inner tray 44 is rigidly fixed to the support structure 22, and includes an outer surface 78 that defines, or carries, two sets of teeth 80A, 80B. Each tooth 80A, 80B is aligned laterally with the next adjacent tooth and extends longitudinally with respect to axis 34. In one example, each tooth 80A, 80B may be a tetrahedral tooth with a point apex 82 located nearest to the opening 74. In one embodiment, the inner tray 44 may be formed with, or into, the support structure 22 as one unitary part. In another embodiment, the inner tray 44 includes only one set of teeth.

The spring seat element 50 is generally annular in shape and includes a hole through which the pin 42 extends. In one example, the element 50 is made of a rubber-like material, and functions as a bumper as the rake assembly is moved between upper and lower rake limits. When the rake assembly 28 is assembled, the spring seat element 50 is located in the opening 72 of the support structure 22, and moves vertically within the opening 72 along with the pin 42 during rake adjustment.

The rocker tray 46 includes an inner surface 84 that opposes the outer surface 78 of the inner tray 44. The inner surface 84 defines, or carries, two sets of teeth 86A, 86B. Each tooth 86A, 86B is aligned laterally with the next adjacent tooth and extends longitudinally with respect to axis 34. In one example, each tooth 86A, 86B may be a tetrahedral tooth with a point apex 88 located nearest to the opening 76. When the rake assembly 28 is in the locked position 66, the sets of teeth 80A, 80B are firmly meshed with the respective sets of teeth 86A, 86B. In another embodiment, and like the inner tray 44, the rocker tray 46 may include only one set of teeth.

In one example, the rocker tray 46 of the rocker assembly 28 includes at least one leg (i.e. two illustrated in FIG. 8 as 90, 92) that project outward from the inner surface 84, are spaced diametrically from one-another with respect to axis 56, and project axially with respect to axis 56. When the rake assembly 28 is assembled, the legs 90, 92 project into the opening 74 of the inner tray to maintain alignment of the trays 44, 46 (also see FIGS. 2 and 3). Each leg 90, 92 carries diametrically opposing, convex faces 94 that facilitates rocking of the rocker tray 46 without interference from opposing sidewalls 96 of the inner tray 44 that, in-part, define the opening 74. In another embodiment, the sidewalls 96 may be carried by the support structure 22.

Figure 6:
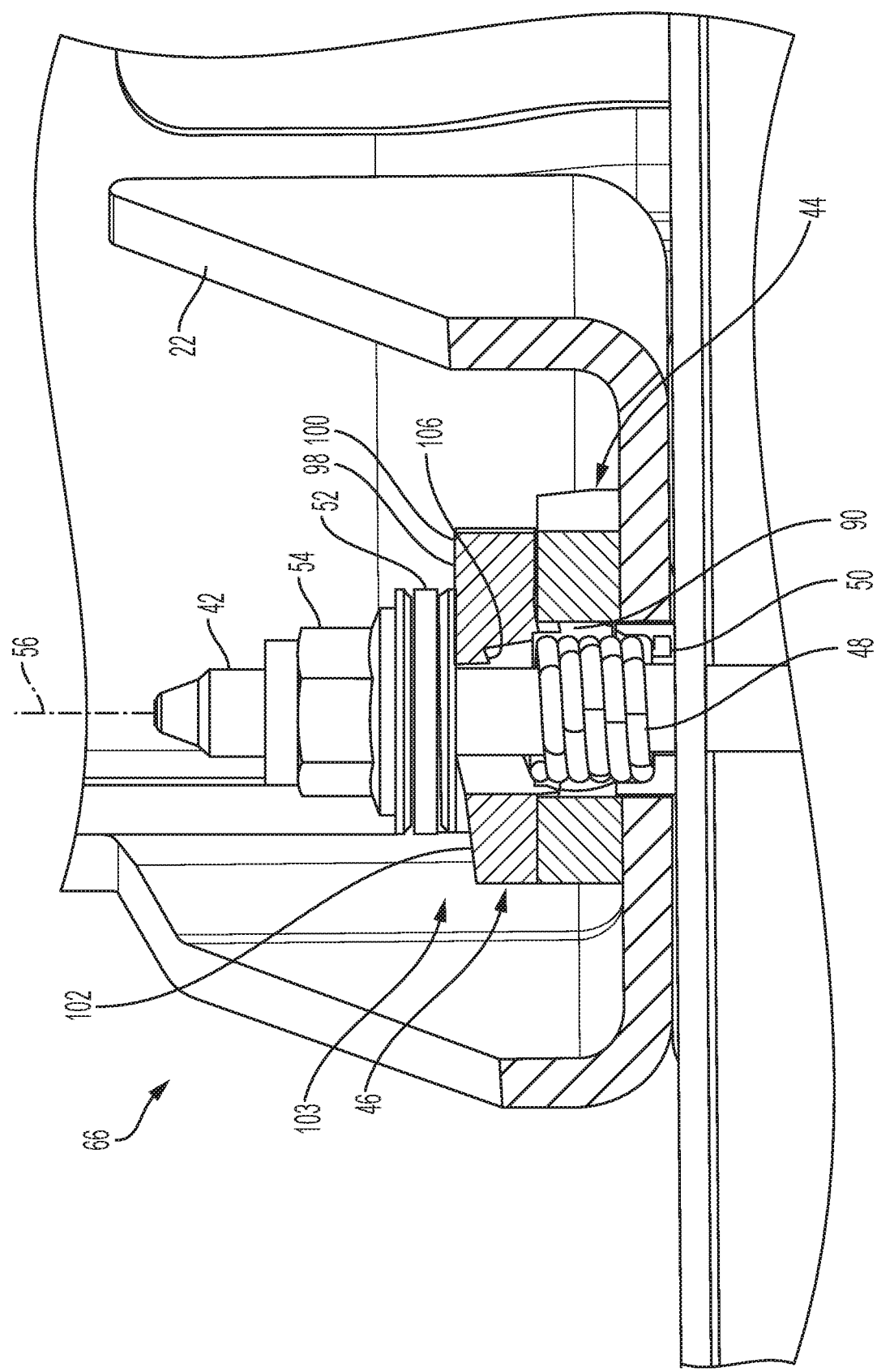
FIG. 6 is a partial, orthographic, cross section of the rake adjustment assembly in the locked position.
Figure 7:
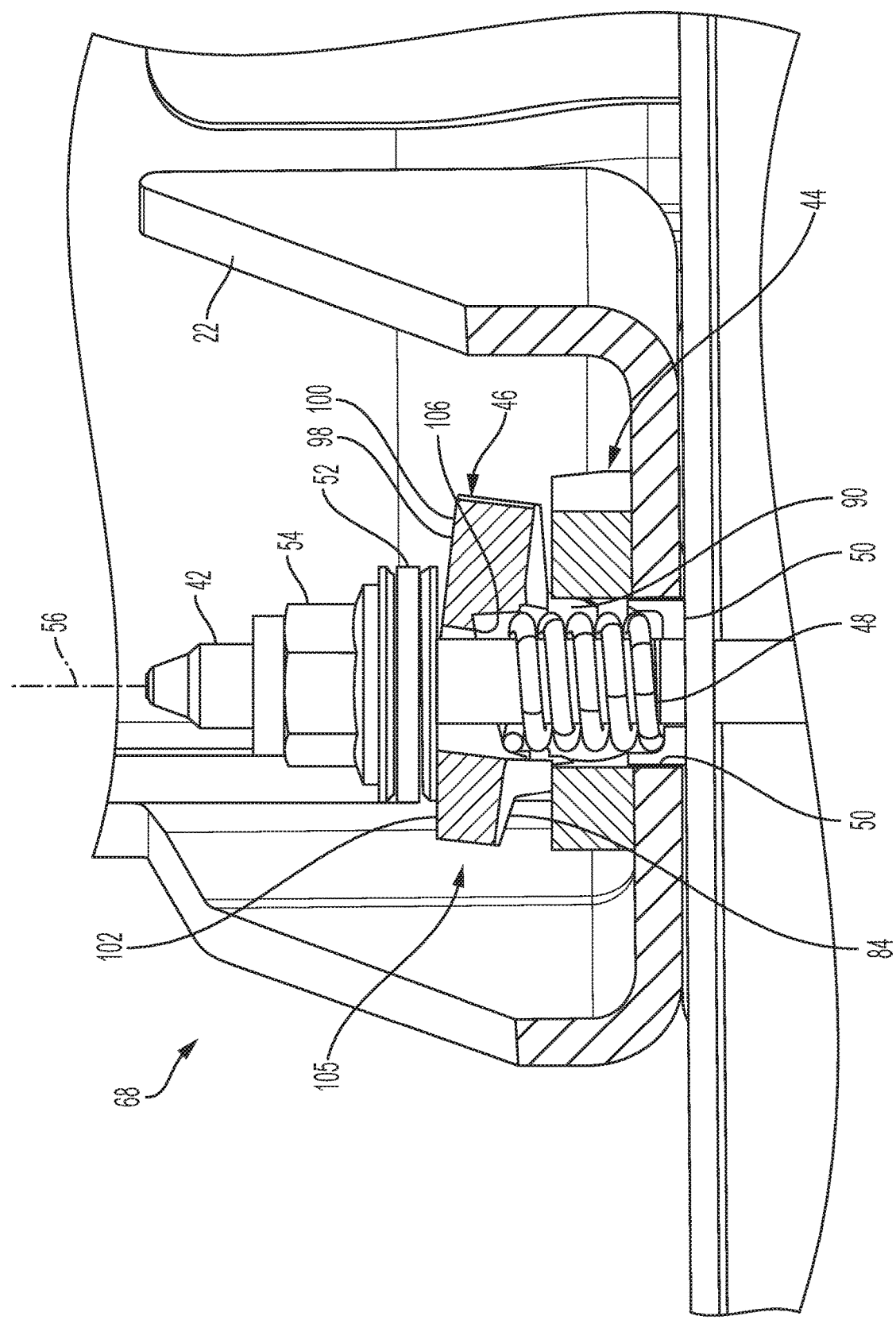
FIG. 7 is a partial, orthographic, cross section of the rake adjustment assembly in the unlocked position.

Referring to FIGS. 6 and 7, the rocker tray 46 further includes an outer surface 98 that substantially faces in an opposite direction to the inner surface 84, and with respect to axis 56. Where the surfaces 78, 84 of the respective inner and rocker trays 44, 46 are generally planar and normal to axis 56, the outer surface 98 of the rocker tray 46 is convex. More specifically, the outer surface 98 is bisected along a line 99 (see FIG. 2) that is substantially normal to the longitudinal lengths of the teeth 86A, 86B, and normal to axis 56. On one side of the line, the outer surface 98 includes a first segment 100 that is substantially planar and normal to axis 56, and on the other side of the line, the outer surface 98 includes a second segment 102 that is angled with respect to axis 56 to facilitate the rocking motion of the rocker tray 46 about a rocker axis 101 (i.e., floating axis) as the rake assembly 28 moves from the locked position 66 (see FIG. 6) to the unlocked position 68 (see FIG. 7).

In one example, the rocker axis 101 is traverse to the axis 56. In another example, the rocker axis 101 is normal to axis 56 and normal to axis 34. The rocker axis 101 is further normal to the longitudinal lengths of the elongated teeth 80A, 80B, 86A, 86B. During operation of the rake assembly 28, the rocker tray 46 is in an un-tilted state 103 (see FIG. 6) when in the locked position 66, and is in a tilted state 105 (see FIG. 7) when in the unlocked position 68.

The spring 48 may be a coiled spring and is axially compressed when the rake assembly 28 is in the locked position 66, and is axially less compressed when the rake assembly 28 is in the unlocked position 68. At one end, the spring 48 is seated axially against the element 50 and at an opposite end, the spring is seated against the rocker tray 46. More specifically and as best shown in FIGS. 6-8, the rocker tray 46 may define a counter bore 104 (or at least a part of a counter bore, see FIG. 8) having bottom face 106 through which the opening 76 communicates. In one example, the bottom face 106 lies with an imaginary plane that is substantially parallel to the segment 102 of the outer surface 98. The spring 48 exerts a force against, and is in biased contact with, the bottom face 106. Because the bottom face 106 (i.e., spring seat face) is not normal with the axis 56, the rocker tray 46 tilts as the rake assembly is moved from the locked position 66 to the unlocked position 68.

During operation of the rake assembly 28, and as the assembly moves from the unlock position 68 and toward the locked position 66, the rocker tray 46 is tilted with respect to the inner tray 44 such that the set of teeth 86A of the rocker tray 46 are axially closer to the set of teeth 80A of the inner tray 44, than the set of teeth 86B are to the set of teeth 80B. With continued locking motion, the rocker tray 46 axially moves closer to the inner tray 44 until the point apex 88 of each tooth 86A is located between point apexes 82 of adjacent teeth 80A. If the inner teeth part and outer teeth part tooth peaks hit one another then the outer teeth part's floating axis allows the outer part to rotate about the floating axis, creating an additional motion that helps the outer teeth to move off or from the "peak to peak" tooth position and into a fully nested position with the inner teeth.

With this inherent, or automatic, alignment of teeth 86A with teeth 80A, the alignment of teeth 86B with teeth 80B is pre-disposed. That is, teeth 86A and teeth 80A mesh first because the rocker tray 46 is tilted, but with continued locking motion, the rocker tray begins to un-tilt and the pre-aligned teeth 86B, 80B mesh together without any interference. It is further contemplated and understood that teeth 86B, 80B may not have point apexes since alignment of these teeth is not at issue.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen

Having thus described the invention, it is claimed:

1. A rake assembly for a steering column comprising:
   a pin adapted to move along a first axis between a locked position and an unlocked position;
   a first tray fixed to a support structure, the first tray having a plurality of teeth; and
   a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis, wherein the plurality of teeth of the rocker tray are located on an inner surface of the rocker tray, the rocker tray including an outer surface defined by a first segment and a second segment, wherein the first segment and the second segment are planar segments oriented at a non-parallel angle relative to each other.

2. The rake assembly of claim 1, wherein the plurality of teeth of the first tray are located on an outer surface of the first tray, wherein the outer surface of the first tray, the inner surface of the rocker tray, and the first segment of the outer surface of the rocker tray are oriented parallel to each other.

3. The rake assembly of claim 1, wherein the inner surface of the rocker tray defines a counter bore having a face that is angled relative to the first segment of the outer surface.

4. The rake assembly of claim 3, wherein the face of the counter bore is oriented parallel relative to the second segment of the outer surface of the rocker tray.

5. The rake assembly of claim 3, wherein a spring is in contact with the face of the counter bore to bias the rake assembly toward the unlocked position.

6. A rake assembly for a steering column comprising:
   a pin adapted to move along a first axis between a locked position and an unlocked position;
   a first tray fixed to a support structure, the first tray having a plurality of teeth;
   a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis;
   a spring in contact with the rocker tray and adapted to bias the rake assembly toward the unlocked position;
   a first opening defined by the support structure;
   a second opening defined by the first tray; and
   a third opening defined by the rocker tray, wherein the spring is at least partially disposed within the first opening and the second opening.

7. The rake assembly of claim 6, further comprising a spring seat element disposed within the first opening, the spring in contact with the spring seat element at a first end of the spring and in contact with the rocker tray at a second end of the spring.

8. The rake assembly of claim 6, wherein the rocker tray includes at least one leg disposed within the second opening to maintain alignment of the rocker tray relative to the first tray.

9. The rake assembly of claim 1, further comprising a nut attached to an end of the pin.

10. The rake assembly of claim 9, further comprising a thrust bearing disposed between the nut and an outer surface of the rocker tray.

11. The rake assembly of claim 1, wherein the second axis is oriented normal to the first axis.

12. The rake assembly of claim 1, wherein the plurality of teeth of the first tray and the plurality of teeth of the rocker tray are tetrahedral teeth with each tooth having a point apex.

13. The rake assembly of claim 1, wherein the plurality of teeth of the first tray are separated as a first set of teeth and a second set of teeth, and the plurality of the teeth of the rocker tray are separated as a third set of teeth and a fourth set of teeth.

14. A rake assembly for a steering column comprising:
a pin adapted to move along a first axis between a locked position and an unlocked position;
a first tray fixed to a support structure, the first tray having a plurality of teeth;
a rocker tray having a plurality of teeth adapted to mesh with the plurality of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray, the second axis being transverse to the first axis, wherein the plurality of teeth of the rocker tray are located on an inner surface of the rocker tray, the rocker tray including an outer surface defined by a first segment and a second segment, wherein the first segment and the second segment are planar segments oriented at a non-parallel angle relative to each other;
a spring in contact with the rocker tray and adapted to bias the rake assembly toward the unlocked position;
a first opening defined by the support structure;
a second opening defined by the first tray; and
a third opening defined by the rocker tray, wherein the spring is at least partially disposed within the first opening and the second opening.

15. The rake assembly of claim 14, further comprising a spring seat element disposed within the first opening, the spring in contact with the spring seat element at a first end of the spring and in contact with the rocker tray at a second end of the spring.

16. The rake assembly of claim 15, wherein the rocker tray includes at least one leg disposed within the second opening to maintain alignment of the rocker tray relative to the first tray.

17. A steering column assembly comprising:
a jacket pivotable about a rake axis;
a pin having a lever operatively coupled to a first end of the pin, the moveable along a first axis between a locked position and an unlocked position;
a support structure operatively coupled to the jacket;
a first tray fixed to the support structure, the first tray having a first plurality of teeth and a second plurality of teeth;
a rocker tray having a third plurality of teeth and a fourth plurality of teeth, the first plurality of teeth adapted to mesh with the third plurality of teeth, and the second plurality of teeth adapted to mesh with the fourth plurality of teeth when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray;
a spring in contact with the rocker tray and adapted to bias the rake assembly toward the unlocked position;
a first opening defined by the support structure;
a second opening defined by the first tray; and
a third opening defined by the rocker tray, wherein the spring is at least partially disposed within the first opening and the second opening.

18. The rake assembly of claim 6, wherein the second axis is oriented normal to the first axis.

19. The rake assembly of claim 6, wherein the plurality of teeth of the first tray and the plurality of teeth of the rocker tray are tetrahedral teeth with each tooth having a point apex.

20. The rake assembly of claim 6, wherein the plurality of teeth of the first tray are separated as a first set of teeth and a second set of teeth, and the plurality of the teeth of the rocker tray are separated as a third set of teeth and a fourth set of teeth.

* * * * *